(12) United States Patent
Kang et al.

(10) Patent No.: US 8,724,507 B2
(45) Date of Patent: May 13, 2014

(54) SYSTEM AND METHOD FOR IMPLEMENTING AN AUTOMATIC DISCOVERY FUNCTION IN A DWDM NETWORK

(75) Inventors: Zhihong Kang, Shenzhen (CN); Zhenyu Wang, Shenzhen (CN)

(73) Assignee: ZTE Corporation, Shenzhen, Guangdong Province (CN)

( * ) Notice: Subject to any disclaimer, the term of this patent is extended or adjusted under 35 U.S.C. 154(b) by 829 days.

(21) Appl. No.: 12/865,955

(22) PCT Filed: Feb. 4, 2008

(86) PCT No.: PCT/CN2008/000319
§ 371 (c)(1),
(2), (4) Date: Aug. 3, 2010

(87) PCT Pub. No.: WO2009/100580
PCT Pub. Date: Aug. 20, 2009

(65) Prior Publication Data
US 2011/0002688 A1    Jan. 6, 2011

(51) Int. Cl.
*H04L 12/28* (2006.01)
(52) U.S. Cl.
USPC .............................................. 370/254; 398/30
(58) Field of Classification Search
None
See application file for complete search history.

(56) References Cited

U.S. PATENT DOCUMENTS

| 6,718,141 | B1 | 4/2004 | deVette | |
| 7,110,670 | B1 * | 9/2006 | Au et al. | 398/48 |
| 7,340,163 | B2 * | 3/2008 | Hardee | 398/4 |
| 2002/0048062 | A1 * | 4/2002 | Sakamoto et al. | 359/124 |
| 2002/0101635 | A1 * | 8/2002 | Taketomi | 359/124 |
| 2002/0191241 | A1 * | 12/2002 | Emery et al. | 359/109 |
| 2003/0212829 | A1 * | 11/2003 | Schofield et al. | 709/250 |
| 2004/0213166 | A1 | 10/2004 | Rambaldi | |

FOREIGN PATENT DOCUMENTS

| CN | 1482745 | 3/2004 |
| CN | 1482751 | 3/2004 |
| CN | 1535516 | 10/2004 |
| EP | 1267519 | 12/2002 |

OTHER PUBLICATIONS

Papdimitriou et. al., "Optical network-to-network interface framework and signaling requirements," *Network Working Group (Internet Draft)* pp. 1-53 (2000).

(Continued)

*Primary Examiner* — Phirin Sam
(74) *Attorney, Agent, or Firm* — Clark & Elbing LLP

(57) ABSTRACT

A system and method for implementing an automatic discovery function in a DWDM network are provided, wherein the system includes: an optical supervisory channel (OSC) being a bi-directional physical channel, configured to transmit information through multiplexing/de-multiplexing a wavelength independent of a master optical channel with the master optical channel; a first ASON control unit, being located in a first node, configured to interact with a second ASON control unit in an adjacent second node through the OSC channel so as to obtain the information of the second ASON control unit; and the second ASON control unit, being located in the second node, configured to interact with the first ASON control unit in the adjacent first node through the OSC channel so as to obtain the information of the first ASON control unit. Thereby, using the method and system of the present invention, the automatic discovery function can be implemented through the OSC channel transmission mechanism.

20 Claims, 5 Drawing Sheets

(56) References Cited

OTHER PUBLICATIONS

Zheng et. al., "An automatic switched optical network test-bed based on GMPLS in Tsinghua University," *Proc. SPIE* 5282: 358-368 (2003).
International Search Report for International Application No. PCT/CN2008/000319, issued Aug. 10, 2010 (4 pages).
International Preliminary Report on Patentability for International Application No. PCT/CN2008/000319, issued Aug. 10, 2010 (4 pages).
Supplementary European Search Report issued in European Application No. 08706497.8 dated Sep. 20, 2012 (7 pages).
Written Opinion of the International Searching Authority International Application No. PCT/CN2008/000319, mailed Nov. 13, 2008 (3 pages).

\* cited by examiner

SYSTEM AND METHOD FOR IMPLEMENTING AN AUTOMATIC DISCOVERY FUNCTION IN A DWDM NETWORK

CROSS-REFERENCE TO RELATED APPLICATION

This application is the U.S. national stage filing under 35 U.S.C. §371 of international application PCT/CN2008/000319, filed Feb. 4, 2008.

FIELD OF THE INVENTION

The present invention relates to automatically switched optical networks, and more particularly, to a system and method for implementing an automatic discovery function in a DWDM network.

BACKGROUND OF THE INVENTION

Along with the technology development and wide application of the optical transport network, the system architecture of the network has an every increasing demand that the optical transport network shall be intelligentized and interconnectable, and the implementation of the entire functional demand of the automatically switched optical network (ASON) in a dense wavelength division multiplexing (DWDM) network becomes a very important practical demand. The automatic discovery serves as a basic function of the ASON function implementation; the automatic neighbor discovery function of control plane may be implemented by using the regeneration section trace tracing byte J0 and the data channel communication byte DCC as the transport mechanism in a synchronous digital hierarchy (SDH) network; there is no fixed transport mechanism for implementing the automatic neighbor discovery function of control plane in a DWDM equipment, which lacks the flexibility in the network intelligence through the mode of manual assignment. A wavelength division equipment transmits dense wavelength division multiplexing signals; various wavelength channels are independent from each other; service signals transmitted by various wavelength channels have no termination function between various nodes; it is not a feasible method to implement the automatic discovery function through the overhead in the frame structure of a service signal transmitted via a certain wavelength channel. At present, a fixed mechanism for implementing the automatic discovery function has not yet been provided in an automatically switched optical network composed of DWDM equipments.

SUMMARY OF THE INVENTION

To solve the problem in the prior art, a system for implementing an automatic discovery function in a DWDM network is provided, including: an optical supervisory channel (OSC) being a bi-directional physical channel, configured to transmit information through multiplexing/de-multiplexing a wavelength independent of a master optical channel with the master optical channel; a first ASON control unit, being located in a first node, configured to interact with a second ASON control unit in an adjacent second node through the OSC channel so as to obtain the information of the second ASON control unit; and the second ASON control unit, being located in the second node, configured to interact with the first ASON control unit in the adjacent first node through the OSC channel so as to obtain the information of the first ASON control unit.

Wherein the OSC channel comprises: a first optical post-amplifier unit, a first OSC supervisory device and a first optical pre-amplifier unit being located in the first node, and a second optical pre-amplifier unit, a second OSC supervisory device and a second optical post-amplifier unit being located in the second node, wherein the first optical post-amplifier unit is connected to the second optical pre-amplifier unit via a master optical channel; the second optical pre-amplifier unit is connected to the second optical post-amplifier unit via the second OSC supervisory device; and the second optical post-amplifier unit is connected to the first optical pre-amplifier unit via the master optical channel; the first optical pre-amplifier unit is connected to the first optical post-amplifier unit via the first OSC supervisory device.

The OSC channel comprises: a first optical post-amplifier unit, a first OSC supervisory device, a first optical pre-amplifier unit, a first optical multiplexer and a first optical de-multiplexer being located in the first node, and a second optical pre-amplifier unit, a second OSC supervisory device, a second optical post-amplifier unit, a second optical multiplexer and a second optical de-multiplexer being located in the second node, wherein the first optical post-amplifier unit is connected to the second optical pre-amplifier unit via a master optical channel; the second optical pre-amplifier unit is connected to the second optical de-multiplexer; the second optical de-multiplexer is connected to the second optical multiplexer via the second OSC supervisory device; and the second optical multiplexer is connected to the second optical post-amplifier unit; and the second optical post-amplifier unit is connected to the first optical pre-amplifier unit via the master optical channel; the first optical pre-amplifier unit is connected to the first optical de-multiplexer; the first optical de-multiplexer is connected to the first optical multiplexer via the first OSC supervisory device; and the first optical multiplexer is connected to the second optical post-amplifier unit.

According to the system of the present invention, the first OSC supervisory device and the second OSC supervisory device are used for receiving and transmitting messages in the OSC channel.

The present invention further discloses a method for implementing an automatic discovery function through a OSC channel transmission mechanism in a DWDM network, including the following steps: step 1, a first ASON control unit in a first node interacting with a first OSC supervisory device to transmit a request message to an adjacent second node through a designated OSC channel; step 2, a second OSC supervisory device in the second node supervising the request message received from the OSC channel in real time, and forwarding the request message to a second ASON control unit in the second node; step 3, the second ASON control unit interacting with the second OSC supervisory device to transmit an ID reply message to the first node through the designated OSC channel; step 4, after detecting the ID reply message in the designated OSC channel, the first OSC supervisory device interacting with the first ASON control unit to form a neighbor acknowledge request message, and transmitting the neighbor acknowledge request message to the second node in the designated OSC channel; and step 5, after receiving the neighbor acknowledge request message through the OSC channel, the second ASON control unit performing a judgment, forming a neighbor acknowledge message according to the judged result, and transmitting the neighbor acknowledge message to the first node through the designated OSC channel.

Wherein step 1 comprises the following processing: the first ASON control unit notifying the first OSC supervisory devise of transmitting a neighbor request message for requesting an adjacent node ID and IP address through the designated OSC channel via an inter-board communication mechanism; and after receiving the neighbor request message from the first ASON control unit, the first OSC supervisory devise transmitting the neighbor request message to the second node through the designated OSC channel.

Step 2 comprises: the second OSC supervisory device in the second node supervising the request message received from the OSC channel in real time, and forwarding the request message to the second ASON control unit in the second node;

Step 3 comprises the following steps: the second ASON control unit requesting the second OSC supervisory device to transmit an ID and IP address encapsulation message of the second node to the first node through the inter-board communication mechanism; and after receiving the request, the second OSC supervisory device transmitting the ID reply message of the second node to the first node through the designated OSC channel.

Step 4 comprises the following processing: after detecting the ID reply message on the designated OSC channel, the first OSC supervisory device forwarding the ID reply message to the first ASON control unit via an internal communication mechanism; after determining that the ID reply message is a message reply of a neighboring node, the first ASON control unit using the ID and IP address of the second node in the ID reply message and the ID and IP address of the first node to form a neighbor acknowledge request message, and requesting the first OSC supervisory device to transmit the neighbor acknowledge request message to the second node; and the first OSC supervisory device transmitting the neighbor acknowledge request message to the second node through the designated OSC channel.

Step 5 comprises: after receiving the neighbor acknowledge request message via the OSC channel, the second ASON control unit judging whether the ID and IP address of the second node in the neighbor acknowledge request message are identical to those of the local node; and if the judged result is that they are identical, the second ASON control unit using the ID and IP address of the first node to form a neighbor acknowledge message, and transmitting the neighbor acknowledge message to the first node through the designated OSC channel.

According to the method of the present invention, the OSC channel comprises: a first optical post-amplifier unit, a first OSC supervisory device and a first optical pre-amplifier unit being located in the first node, and a second optical pre-amplifier unit, a second OSC supervisory device and a second optical post-amplifier unit being located in the second node, wherein the first optical post-amplifier unit is connected to the second optical pre-amplifier unit via a master optical channel; the second optical pre-amplifier unit is connected to the second optical post-amplifier unit via the second OSC supervisory device; and the second optical post-amplifier unit is connected to the first optical pre-amplifier unit via the master optical channel; the first optical pre-amplifier unit is connected to the first optical post-amplifier unit via the first OSC supervisory device.

The OSC channel comprises: a first optical post-amplifier unit, a first OSC supervisory device, a first optical pre-amplifier unit, a first optical multiplexer and a first optical de-multiplexer being located in the first node, and a second optical pre-amplifier unit, a second OSC supervisory device, a second optical post-amplifier unit, a second optical multiplexer and a second optical de-multiplexer being located in the second node, wherein the first optical post-amplifier unit is connected to the second optical pre-amplifier unit via a master optical channel; the second optical pre-amplifier unit is connected to the second optical de-multiplexer; the second optical de-multiplexer is connected to the second optical multiplexer via the second OSC supervisory device; and the second optical multiplexer is connected to the second optical post-amplifier unit; the second optical post-amplifier unit is connected to the first optical pre-amplifier unit via the master optical channel; the first optical pre-amplifier unit is connected to the first optical de-multiplexer; the first optical de-multiplexer is connected to the first optical multiplexer via the first OSC supervisory device; and the first optical multiplexer is connected to the second optical post-amplifier unit.

According to the above steps, through traversing various OSC channels in a node one by one under the control of the OSC supervisory device and ASON control unit, it is possible to discover the IDs and IP addresses of various nodes adjacent to the node.

Therefore, through the method and system of the present invention, the OSC channel is carried in the physical transport link (i.e. TE link) through the wavelength independent of the master optical service channel and is multiplexed with the master optical service channel for transmitting information; the automatic discovery function can be implemented through the OSC channel transmission mechanism, which overcomes the problem that there is no physical link layer neighbor discovery mechanism related to the DWDM equipment network in the standards.

Other features and advantages of the present invention will be described in the following description and partly become obvious from the description, or be understood by implementing the present invention. The objects and other advantages of the present invention can be realized and obtained through the structures indicated by the description, claims and drawings.

BRIEF DESCRIPTION OF THE DRAWINGS

The drawings provide a further understanding of the present invention and form a part of the specification. The embodiments and the drawings are used to explain the present invention without unduly limiting the scope of the present invention, wherein.

DETAILED DESCRIPTION OF THE INVENTION

A detailed description is given to the preferred embodiments of the invention with reference to the accompanying drawings. The preferred embodiment of the present invention is described for the purpose of illustration, not for limiting the present invention.

The present invention mainly relates to the description of an automatic discovery mechanism of an ASON intelligent control plane implemented on the DWDM transmission network at present; it is a very feasible method to implement the DWDM network automatic discovery function in the OSC channel manner, and at the same time it overcomes the problem that no solution with this respect has been provided in the present standards.

Figure 1:
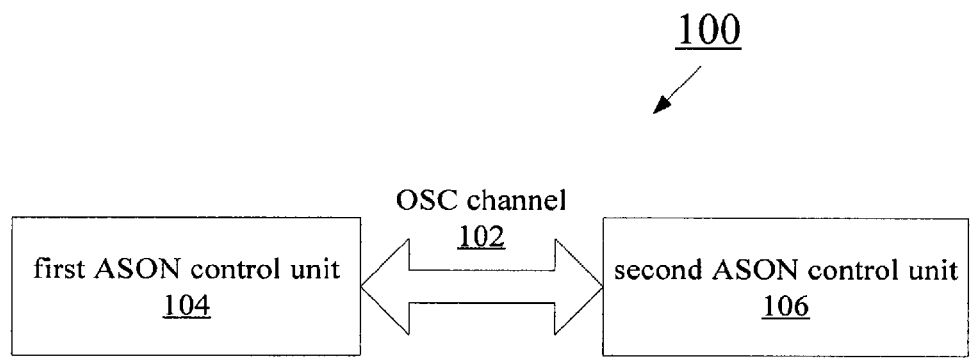
FIG. 1 is a block diagram illustrating the system according to the present invention.

FIG. 1 is a block diagram illustrating the system 100 according to the present invention.

As shown in FIG. 1, the system includes: an OSC channel 102, configured to transmit information through multiplexing/de-multiplexing a wavelength independent of a master optical band with a master optical channel; a first ASON control unit 104, being located in a first node, configured to interact with a second ASON control unit in an adjacent second node through the OSC channel so as to obtain the information of the second ASON control unit; and the second ASON control unit 106, being located in the second node, configured to interact with the first ASON control unit in the adjacent first node through the OSC channel so as to obtain the information of the first ASON control unit.

Wherein the OSC channel comprises: a first optical post-amplifier unit, a first OSC supervisory device and a first optical pre-amplifier unit being located in the first node, and a second optical pre-amplifier unit, a second OSC supervisory device and a second optical post-amplifier unit being located in the second node, wherein the first optical post-amplifier unit is connected to the second optical pre-amplifier unit via a master optical channel; the second optical pre-amplifier unit is connected to the second optical post-amplifier unit via the second OSC supervisory device; and the second optical post-amplifier unit is connected to the first optical pre-amplifier unit via the master optical channel; the first optical pre-amplifier unit is connected to the first optical post-amplifier unit via the first OSC supervisory device.

The OSC channel comprises: a first optical post-amplifier unit, a first OSC supervisory device, a first optical pre-amplifier unit, a first optical multiplexer and a first optical de-multiplexer being located in the first node, and a second optical pre-amplifier unit, a second OSC supervisory device, a second optical post-amplifier unit, a second optical multiplexer and a second optical de-multiplexer being located in the second node, wherein the first optical post-amplifier unit is connected to the second optical pre-amplifier unit via a master optical channel; the second optical pre-amplifier unit is connected to the second optical de-multiplexer; the second optical de-multiplexer is connected to the second optical multiplexer via the second OSC supervisory device; and the second optical multiplexer is connected to the second optical post-amplifier unit; and the second optical post-amplifier unit is connected to the first optical pre-amplifier unit via the master optical channel; the first optical pre-amplifier unit is connected to the first optical de-multiplexer; the first optical de-multiplexer is connected to the first optical multiplexer via the first OSC supervisory device; and the first optical multiplexer is connected to the second optical post-amplifier unit.

According to the system of the present invention, the first OSC supervisory device and the second OSC supervisory device are used for receiving and transmitting messages in the OSC channel.

Figure 2:
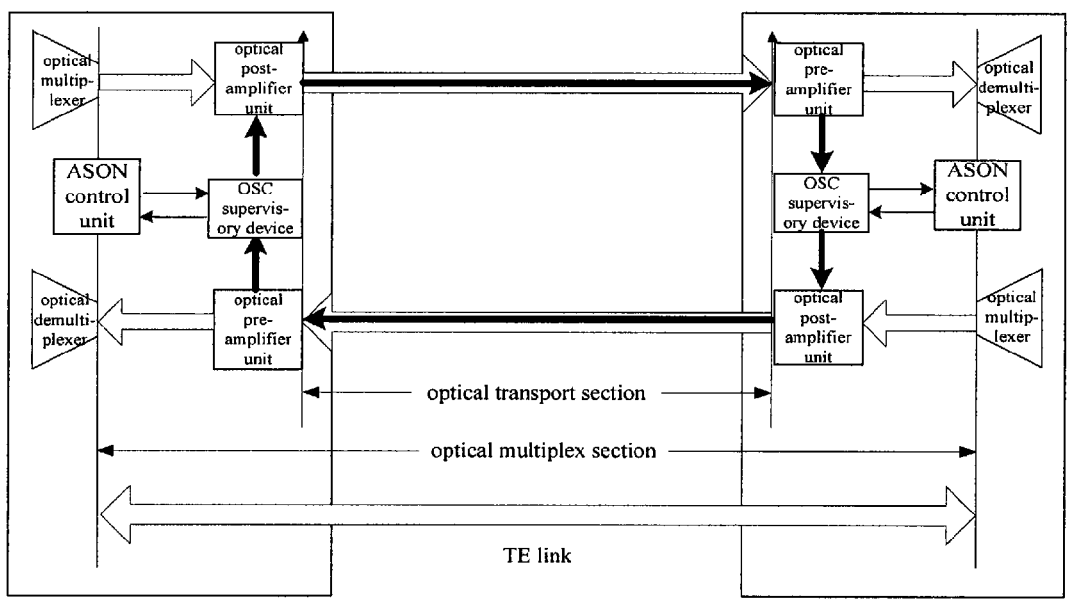
FIG. 2 is a schematic diagram illustrating an OSC channel according to one aspect of the present invention.

FIG. 2 is a schematic diagram illustrating an OSC channel according to one aspect of the present invention.

As shown in FIG. 2, in a DWDM network equipment, the OSC channel (being used for transmitting control information, using a wavelength independent of the master optical band, as shown by the black arrows in FIG. 2) is multiplexed with the master optical channel (being used for transmitting services and including multiple wavelengths) through the optical post-amplifier unit to form an optical multiplex section signal in the transmitting direction, and the optical multiplex section signal is transmitted out on the transport link; in the receiving direction, the signals, transmitted by the OSC channel, in the optical multiplex section signals is separated from the master optical channel through the optical pre-amplifier unit, which is basically the mode defined in G. 709 for OSC channel. As shown in FIG. 2, the OSC supervisory device is responsible for multiplexing the information, which needs to be transmitted in the OSC channel, with the master optical service channel at the optical post-amplifier unit through a fixed wavelength, and transmitting it out via a physical transport link to complete the transmitting processing of the OSC channel; at the same time, the OSC supervisory device separates the signals transmitted through the OSC channel in the physical transport link from the master optical service channel through the optical pre-amplifier unit to complete the receiving processing of the OSC channel.

Figure 3:
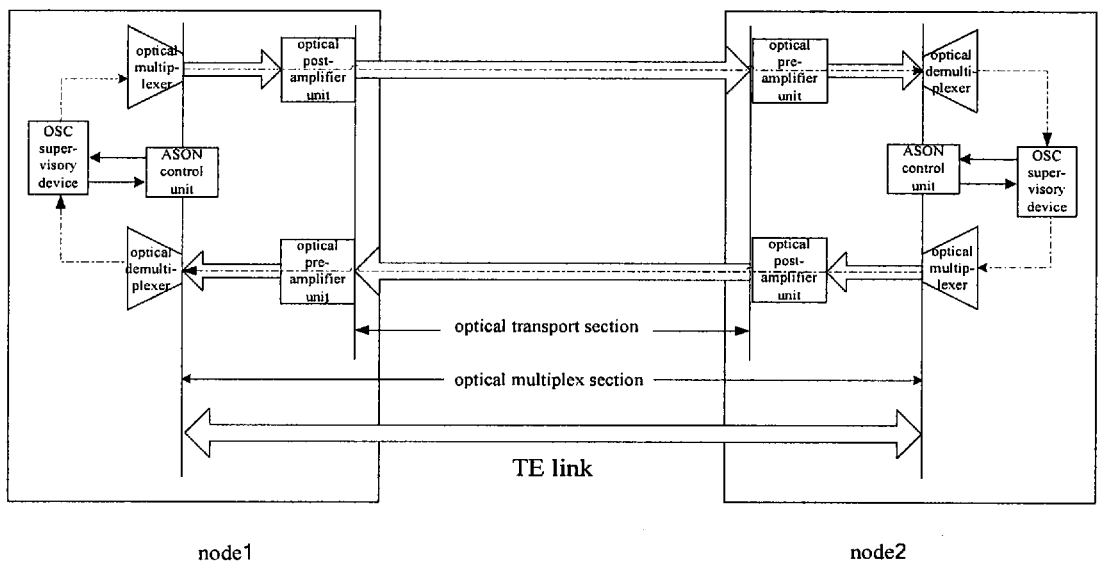
FIG. 3 is a schematic diagram illustrating an OSC channel according to another aspect of the present invention.

Alternatively, as shown in FIG. 3, the OSC supervisory device is responsible for multiplexing the information, which needs to be transmitted through the OSC channel, with the master optical service channel at the optical multiplexer through a fixed wavelength, and transmitting it out via the physical transport link to complete the transmitting processing of the OSC channel; at the same time, the OSC supervisory device separates the signals transmitted through the OSC channel in the physical transport link from the master optical service channel via the optical de-multiplexer, to complete the receiving processing of the OSC channel. The device manner as shown in FIG. 2 is more similar to the definition of the OSC channel in G. 709.

The physical transport link between adjacent nodes of the DWDM network includes the sum of three bi-directional link sections respectively between the optical multiplexer and the optical post-amplifier unit, between the optical post-amplifier unit and the optical pre-amplifier unit, and between the optical pre-amplifier unit and the optical de-multiplexer; without considering Link Bundle, the physical transport link is just the basic unit, TE link, of service transport topology in the DWDM network device, being also a data link, i.e. a TE link abstracted between Node-1 and Node-2 in FIG. 2.

In the control plane neighbor discovery process, the OSC channel may serve as a transport forwarding channel in the process of establishing and maintaining a control channel, may also serve as the transport mechanism of in-band connectivity verification of physical link; the control channel may be established between adjacent nodes through the out-band data communication network (DCN) forwarding mechanism.

The transmission network composed of DWDM equipments is a service hierarchical model and is divided into optical transport section layer, optical multiplex section layer, optical wavelength channel layer and optical sub-wavelength channel layer; the present invention mainly relates to the description of the automatic discovery function based on the optical multiplex section layer; the optical multiplex section layer refers to the sum of the three bi-directional link sections between the optical multiplexer and the optical de-multiplexer in Node-1 and Node-2 as shown in FIG. 2, which is a TE link between adjacent nodes of the DWDM network. For the optical wavelength channel layer and sub-wavelength channel layer, if the carried service signal is an SDH frame structure signal, the automatic discovery function of the optical wavelength channel layer and sub-wavelength channel layer may be implemented by using tracing byte J0 in the SDH; if the carried service signal is a optical transport network (OTN) frame structure signal, the automatic discovery function of the optical wavelength channel layer and sub-wavelength channel layer may be implemented by using tracing byte TTI in the OTN.

A first embodiment of the system of the present invention is described hereinafter.

At first, a control channel can be automatically established between adjacent nodes, and the ASON control units of adjacent nodes need to know the neighboring node ID and the IP address of the ASON control unit of the opposite end, so as to establish a control channel automatically; the process of studying the neighboring node ID and the IP address of the ASON control unit of the opposite end is performed through an OSC channel; an OSC supervisory device is a device for controlling the OSC channel to receive and transmit messages, which may be a control unit or a functional single board in the system and is mainly responsible for routing control and forwarding function in the system, on which an OSPF routing protocol is executed; at the same time, the OSC supervisory device may run an application for transmitting messages to a neighboring node through a designated OSC channel and for receiving messages from a neighboring node; this application is a point-to-point service which is a communication application of adjacent OSC supervisory devices and is served for the ASON control unit; the ASON control unit establishes an internal communication mechanism with the OSC supervisory device; the ASON control unit will request the OSC supervisory device to transmit messages through the designated OSC channel; at the same time, the OSC supervisory device supervises the OSC channel; when it is supervised that messages are received from the OSC channel, the OSC supervisory device will forward the received messages to the ASON control unit via the internal communication mechanism.

Figure 4:
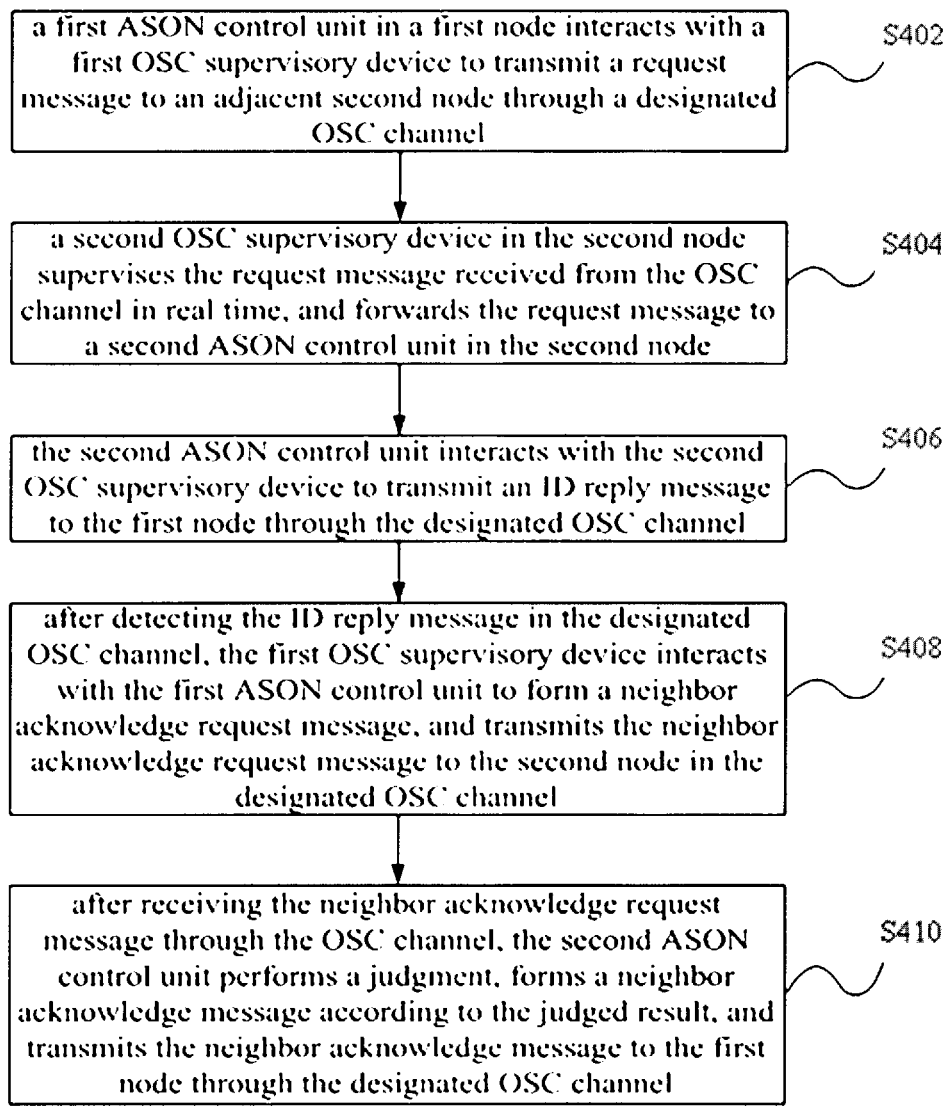
FIG. 4 is a flowchart of the method according to the present invention.

FIG. 4 is a flowchart of the method according to the present invention.

As shown in FIG. 4, the method includes:

S402, a first ASON control unit in a first node interacts with a first OSC supervisory device to transmit a request message to an adjacent second node through a designated OSC channel;

S404, a second OSC supervisory device in the second node supervises the request message received from the OSC channel in real time, and forwards the request message to a second ASON control unit in the second node;

S406, the second ASON control unit interacts with the second OSC supervisory device to transmit an ID reply message to the first node through the designated OSC channel;

S408, after detecting the ID reply message in the designated OSC channel, the first OSC supervisory device interacts with the first ASON control unit to form a neighbor acknowledge request message, and transmits the neighbor acknowledge request message to the second node in the designated OSC channel; and S410, after receiving the neighbor acknowledge request message through the OSC channel, the second ASON control unit performs a judgment, forms a neighbor acknowledge message according to the judged result, and transmits the neighbor acknowledge message to the first node through the designated OSC channel.

Wherein S402 comprises the following processing: the first ASON control unit notifies the first OSC supervisory device of transmitting a neighbor request message for requesting an adjacent node ID and IP address through the designated OSC channel via an inter-board communication mechanism; and after receiving the neighbor request message from the first ASON control unit, the first OSC supervisory devise transmits the neighbor request message to the second node through the designated OSC channel.

S406 comprises: the second ASON control unit requests the second OSC supervisory device to transmit an ID and IP address encapsulation message of the second node to the first node through the inter-board communication mechanism; and after receiving the request, the second OSC supervisory device transmits the ID reply message of the second node to the first node through the designated OSC channel.

S408 comprises the following processing: after detecting the ID reply message on the designated OSC channel, the first OSC supervisory device forwards the ID reply message to the first ASON control unit via an internal communication mechanism; after determining that the ID reply message is a message reply of a neighboring node, the first ASON control unit uses the ID and IP address of the second node in the ID reply message and the ID and IP address of the first node to form a neighbor acknowledge request message, and requests the first OSC supervisory device to transmit the neighbor acknowledge request message to the second node; and the first OSC supervisory device transmits the neighbor acknowledge request message to the second node through the designated OSC channel.

S410 comprises: after receiving the neighbor acknowledge request message via the OSC channel, the second ASON control unit judges whether the ID and IP address of the second node in the neighbor acknowledge request message are identical to those of the local node; and if the judged result is that they are identical, the second ASON control unit uses the ID and IP address of the first node to form a neighbor acknowledge message, and transmits the neighbor acknowledge message to the first node through the designated OSC channel.

According to the method of the present invention, the OSC channel comprises: a first optical post-amplifier unit, a first OSC supervisory device and a first optical pre-amplifier unit being located in the first node, and a second optical pre-amplifier unit, a second OSC supervisory device and a second optical post-amplifier unit being located in the second node, wherein the first optical post-amplifier unit is connected to the second optical pre-amplifier unit via a master optical channel; the second optical pre-amplifier unit is connected to the second optical post-amplifier unit via the second OSC supervisory device; and the second optical post-amplifier unit is connected to the first optical pre-amplifier unit via the master optical channel; the first optical pre-amplifier unit is connected to the first optical post-amplifier unit via the first OSC supervisory device.

The OSC channel comprises: a first optical post-amplifier unit, a first OSC supervisory device, a first optical pre-amplifier unit, a first optical multiplexer and a first optical de-multiplexer being located in the first node, and a second optical pre-amplifier unit, a second OSC supervisory device, a second optical post-amplifier unit, a second optical multiplexer and a second optical de-multiplexer being located in the second node, wherein the first optical post-amplifier unit is connected to the second optical pre-amplifier unit via a master optical channel; the second optical pre-amplifier unit is connected to the second optical de-multiplexer; the second optical de-multiplexer is connected to the second optical multiplexer via the second OSC supervisory device; and the second optical multiplexer is connected to the second optical post-amplifier unit; the second optical post-amplifier unit is connected to the first optical pre-amplifier unit via the master optical channel; the first optical pre-amplifier unit is connected to the first optical de-multiplexer; the first optical de-multiplexer is connected to the first optical multiplexer via the first OSC supervisory device; and the first optical multiplexer is connected to the second optical post-amplifier unit.

Figure 5:
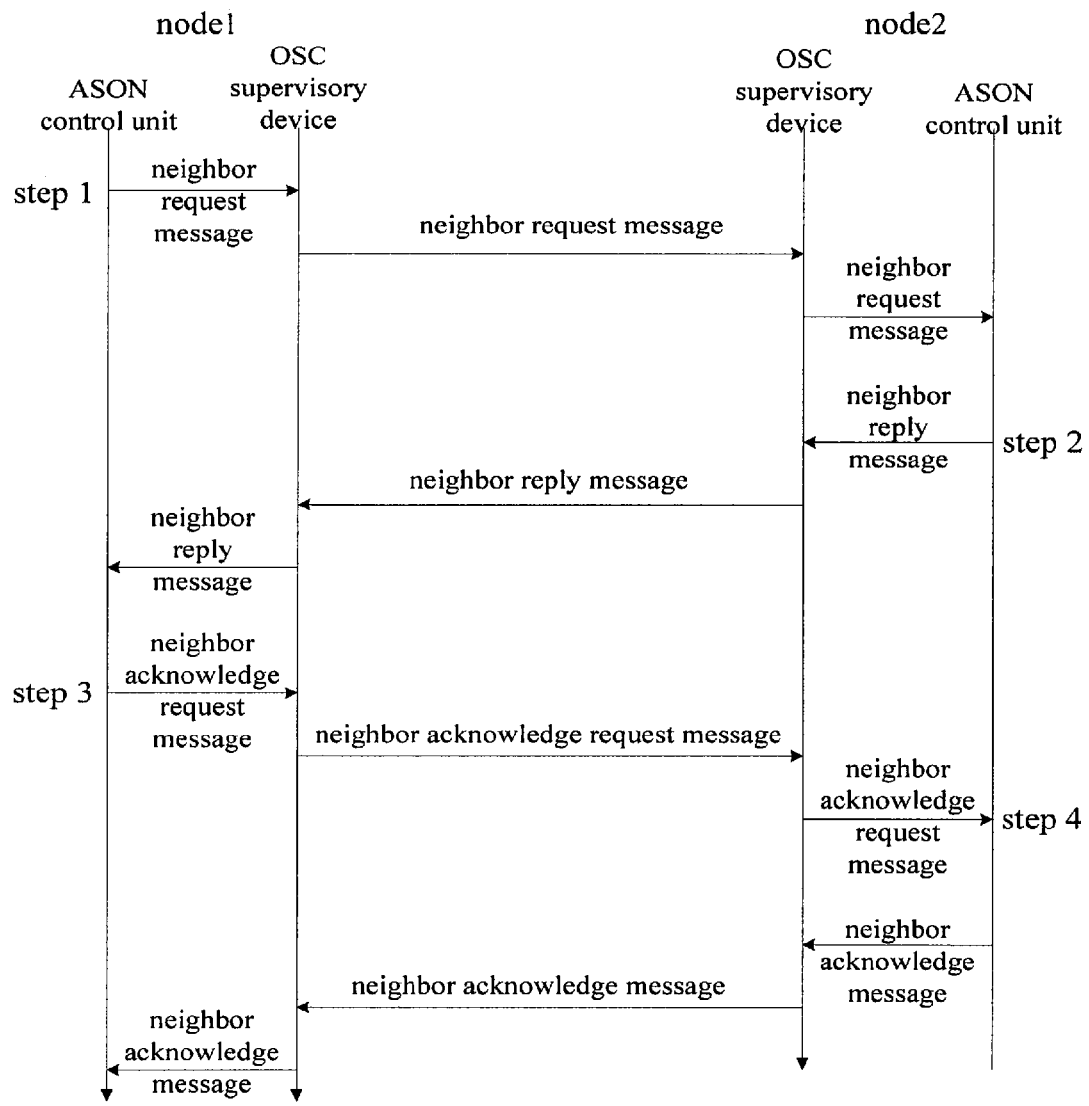
FIG. 5 is a flowchart of the neighbor discovery process through an OSC channel according to the method of the present invention.

FIG. 5 is a flowchart of the neighbor discovery process through an OSC channel according to the method of the present invention.

As shown in FIG. 5, the ASON control units of adjacent nodes need to study the ID and IP address of the opposite end through the OSC channel, and the detailed process includes:

Step 1, the ASON control unit of Node-1 notifies, via the inter-board communication mechanism, the OSC supervisory device of transmitting a message for requesting an adjacent node ID and IP address through a designated OSC channel; after receiving the request from the ASON control unit, the OSC supervisory device transmits the neighbor request message to the opposite end through the designated OSC channel;

Step 2, the OSC supervisory device of the opposite end, Node-2, supervises the message received from the OSC channel in real time, and forwards the received message to the local ASON control unit; after judging it is a message transmitted by an adjacent node for requesting the local node ID and the local IP address by means of analysis, the ASON control unit requests, via the inter-board communication mechanism, the OSC supervisory device to transmit the local node ID (Node-2) and the local IP address encapsulation message to the opposite end through the corresponding OSC channel; after receiving the request, the OSC supervisory device will transmit the local node ID reply message to the opposite end through a designated OSC channel;

Step 3, after detecting there is a message to be received in the corresponding OSC channel, the OSC supervisory device of Node-1 forwards the received message to the ASON control unit via the internal communication mechanism; after discovering it is a reply message for the neighbor node ID and the neighbor IP address request according to the message type, the ASON control unit uses the received neighboring node ID (Node-2), neighboring IP address, local node ID (Node-1) and local IP address to form a neighbor acknowledge request message, and requests, via the internal communication mechanism, the OSC supervisory device to transmit it out through the corresponding OSC channel; and Step 4, after receiving the neighbor acknowledge request message transmitted by Node-1 through the OSC channel, the ASON control unit of Node-2 detects that the neighboring node ID (Node-2) and neighboring IP address field are identical to itself, uses the received node ID (Node-2) and IP address of the opposite end to form a neighbor acknowledge message (ACK), and transmits the neighbor acknowledge message to Node-1 via the OSC channel.

Through the above process, the ASON control units between adjacent nodes have all learned the node ID and IP address of the opposite end.

Figure 6:
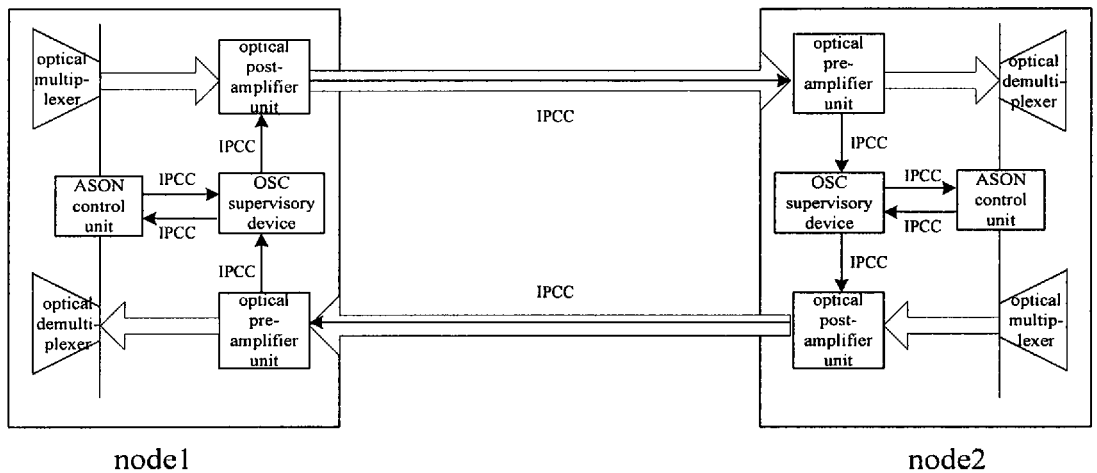
FIG. 6 is a block diagram for constructing a control channel on the OSC route forwarding mechanism according to the present invention.

FIG. 6 is a block diagram for constructing a control channel on the OSC route forwarding mechanism according to the present invention.

Figure 7:
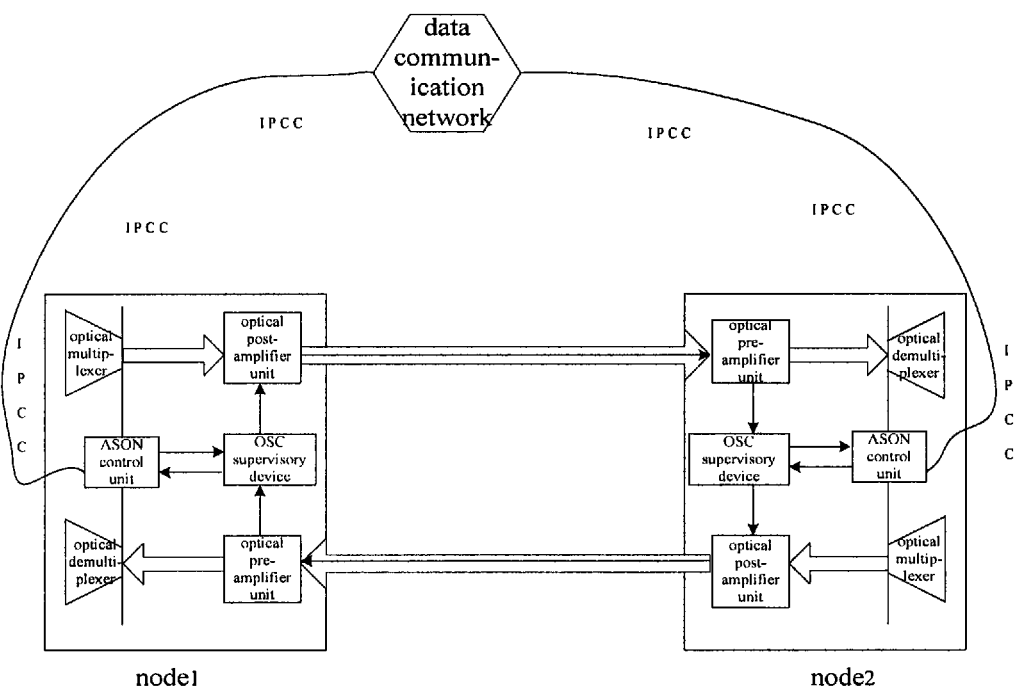
FIG. 7 is a block diagram for constructing a control channel on the DCN forwarding mechanism according to the present invention.

FIG. 7 is a block diagram for constructing a control channel on the DCN forwarding mechanism according to the present invention.

As shown in FIG. 6 and FIG. 7, after detecting the node ID and IP address of the neighboring ASON control unit, the ASON control unit completes the establishment of a control channel through the interaction of the messages Config, ConfigAck and Hello of the link management protocol (LMP); the control channel may be established depending on the control of the OSC channel by the OSC supervisory device or established by means of the route forwarding mechanism of the out-band DCN.

After the control channel has been established, the link connectivity verification and link property correlation may be performed for various transport links of the nodes; the in-band transport mode of the link connectivity verification may be realized by transmitting verification information (Test or Trace message, associated with the link verification mechanism) through the OSC channel which is bound with the transport link, the verification information may be implemented by the communication application of the OSC supervisory device; the link property correlation may be performed in the control channel; the above processes are implemented through the LMP protocol. In this way, the automatic discovery function of the DWDM network is completely implemented; the OSC channel transports messages between the adjacent ASON control units in the mode of IP message.

In the above embodiments, the automatic discovery function is implemented by the OSC channel transmission mechanism; the mechanism is recommended to be included in the standard proposal as the physical link layer neighbor discovery mechanism of the DWDM device network; the ITUT-G.7714.1-200304 defines the layer neighbor discovery mechanism (Jx in SDH or TTI in OTN) of the SDH network and the OTN network; the G. 709 defines that an OSC channel serves as the channel for transporting OTM overhead signals.

In view of the above, using the method and system of the present invention, the automatic discovery function can be implemented through the OSC channel transmission mechanism, which overcomes the problem that the physical link layer neighbor discovery mechanism of the DWDM network has not been provided yet in the standards.

Above description is only to illustrate the preferred embodiments but not to limit the present invention. Various alterations and changes to the present invention are apparent to those skilled in the art. The scope defined in claims shall comprise any modification, equivalent substitution and improvement within the spirit and principle of the present invention.

What is claimed is:

1. A system for implementing an automatic discovery function in a Dense Wavelength Division Multiplexing, DWDM, network, comprising:
   an optical supervisory channel, being a bi-directional physical channel, configured to transmit information through multiplexing/de-multiplexing a wavelength independent of a master optical channel with the master optical channel;
   a first Automatically Switched Optical Network, ASON, control unit, being located in a first node, configured to interact with a second ASON control unit in an adjacent second node through the optical supervisory channel so as to obtain the information of the second ASON control unit; and
   the second ASON control unit, being located in the second node, configured to interact with the first ASON control unit in the adjacent first node through the optical supervisory channel so as to obtain the information of the first ASON control unit,
   wherein an automatic discovery function of a physical transport link layer in the DWDM network is implemented through the transmission mechanism of the optical supervisory channel; and the automatic discovery functions of an optical transport section layer and an optical multiplex section layer in the DWDM network are implemented through the transmission mechanism of the optical supervisory channel;

the system further comprising: a first optical supervisory device located in the first node and a second optical supervisory device located in the second node, wherein the first ASON control unit in the first node is configured to interact with the first optical supervisory device to transmit a request message to the adjacent second node through a designated optical supervisory channel;

the second optical supervisory device is configured to supervise the request message received from the optical supervisory channel in real time, and forward the request message to the second ASON control unit in the second node;

the second ASON control unit is configured to interact with the second optical supervisory device to transmit an Identifier, ID, reply message to the first node through the designated optical supervisory channel;

the first optical supervisory device is configured to, after detecting the ID reply message in the designated optical supervisory channel, interact with the first ASON control unit to form a neighbor acknowledge request message, and transmit the neighbor acknowledge request message to the second node in the designated optical supervisory channel; and the second ASON control unit is configured to, after receiving the neighbor acknowledge request message through the optical supervisory channel, perform a judgment, form a neighbor acknowledge message according to the judged result, and transmit the neighbor acknowledge message to the first node through the designated optical supervisory channel.

2. The system according to claim 1, wherein the optical supervisory channel comprises:

a first optical post-amplifier unit, a first optical supervisory device and a first optical pre-amplifier unit being located in the first node, and a second optical pre-amplifier unit, a second optical supervisory device and a second optical post-amplifier unit being located in the second node, wherein the first optical post-amplifier unit is connected to the second optical pre-amplifier unit via a master optical channel; the second optical pre-amplifier unit is connected to the second optical post-amplifier unit via the second optical supervisory device;

the second optical post-amplifier unit is connected to the first optical pre-amplifier unit via the master optical channel; the first optical pre-amplifier unit is connected to the first optical post-amplifier unit via the first optical supervisory device; and the first optical supervisory device multiplexes the information, which needs to be transmitted in the optical supervisory channel, with the master optical channel at the first optical post-amplifier unit through a fixed wavelength and transmits it out via a physical transport link to complete the transmitting processing of the optical supervisory channel; and the second optical supervisory device separates the signals transmitted by the optical supervisory channel from the master optical channel in the physical transport link through the second optical pre-amplifier unit to complete the receiving processing of the optical supervisory channel.

3. The system according to claim 1, wherein the optical supervisory channel comprises:

a first optical post-amplifier unit, a first optical supervisory device, a first optical pre-amplifier unit, a first optical multiplexer and a first optical de-multiplexer being located in the first node, and a second optical pre-amplifier unit, a second optical supervisory device, a second optical post-amplifier unit, a second optical multiplexer and a second optical de-multiplexer being located in the second node, wherein the first optical post-amplifier unit is connected to the second optical pre-amplifier unit via a master optical channel; the second optical pre-amplifier unit is connected to the second optical de-multiplexer; the second optical de-multiplexer is connected to the second optical multiplexer via the second optical supervisory device; and the second optical multiplexer is connected to the second optical post-amplifier unit;

the second optical post-amplifier unit is connected to the first optical pre-amplifier unit via the master optical channel; the first optical pre-amplifier unit is connected to the first optical de-multiplexer; the first optical de-multiplexer is connected to the first optical multiplexer via the first optical supervisory device; and the first optical multiplexer is connected to the second optical post-amplifier unit; and the first optical supervisory device multiplexes the information, which needs to be transmitted in the optical supervisory channel, with the master optical channel at the first optical multiplexer through a fixed wavelength and transmits it out via a physical transport link to complete the transmitting processing of the optical supervisory channel; and the second optical supervisory device separates the signals transmitted by the optical supervisory channel from the master optical channel in the physical transport link through the second optical de-multiplexer to complete the receiving processing of the optical supervisory channel.

4. The system according to claim 2, wherein the physical transport link comprises any of the following: an optical transport section, an optical multiplex section, and a TE link.

5. A method for implementing automatic discovery function in a Dense Wavelength Division Multiplexing, DWDM, network, comprising the following steps:

step 1, a first Automatically Switched Optical Network, ASON, control unit in a first node interacting with a first optical supervisory device to transmit a request message to an adjacent second node through a designated optical supervisory channel;

step 2, a second optical supervisory device in the second node supervising the request message received from the optical supervisory channel in real time, and forwarding the request message to a second ASON control unit in the second node;

step 3, the second ASON control unit interacting with the second optical supervisory device to transmit an Identifier, ID, reply message to the first node through the designated optical supervisory channel;

step 4, after detecting the ID reply message in the designated optical supervisory channel, the first optical supervisory device interacting with the first ASON control unit to form a neighbor acknowledge request message, and transmitting the neighbor acknowledge request message to the second node in the designated optical supervisory channel; and step 5, after receiving the neighbor acknowledge request message through the optical supervisory channel, the second ASON control unit performing a judgment, forming a neighbor acknowledge message according to the judged result, and transmitting the neighbor acknowledge message to the first node through the designated optical supervisory channel.

6. The method according to claim 5, wherein step 1 comprises the following processing:

the first ASON control unit notifying the first optical supervisory device of transmitting a neighbor request message for requesting an adjacent node ID and IP address through the designated optical supervisory channel via an inter-board communication mechanism; and after receiving the neighbor request message from the first ASON control unit, the first optical supervisory device transmitting the neighbor request message to the second node through the designated optical supervisory channel.

7. The method according to claim 6, wherein step 3 comprises:

the second ASON control unit requesting the second optical supervisory device to transmit an ID and IP address encapsulation message of the second node to the first node through the inter-board communication mechanism; and after receiving the request, the second optical supervisory device transmitting the ID reply message of the second node to the first node through the designated optical supervisory channel.

8. The method according to claim 7, wherein step 4 comprises the following processing:

after detecting the ID reply message on the designated optical supervisory channel, the first optical supervisory device forwarding the ID reply message to the first ASON control unit via an internal communication mechanism;

after determining that the ID reply message is a message reply of a neighboring node, the first ASON control unit using the ID and IP address of the second node in the ID reply message and the ID and IP address of the first node to form a neighbor acknowledge request message, and requesting the first optical supervisory device to transmit the neighbor acknowledge request message to the second node; and the first optical supervisory device transmitting the neighbor acknowledge request message to the second node through the designated optical supervisory channel.

9. The method according to claim 8, wherein step 5 comprises:

after receiving the neighbor acknowledge request message via the optical supervisory channel, the second ASON control unit judging whether the ID and IP address of the second node in the neighbor acknowledge request message are identical to those of the local node; and if the judged result is that they are identical, the second ASON control unit using the ID and IP address of the first node to form a neighbor acknowledge message, and transmitting the neighbor acknowledge message to the first node through the designated optical supervisory channel.

10. The method according to claim 5, wherein the optical supervisory channel comprises:

a first optical post-amplifier unit, a first optical supervisory device and a first optical pre-amplifier unit being located in the first node, and a second optical pre-amplifier unit, a second optical supervisory device and a second optical post-amplifier unit being located in the second node, wherein the first optical post-amplifier unit is connected to the second optical pre-amplifier unit via a master optical channel; the second optical pre-amplifier unit is connected to the second optical post-amplifier unit via the second optical supervisory device; and the second optical post-amplifier unit is connected to the first optical pre-amplifier unit via the master optical channel; the first optical pre-amplifier unit is connected to the first optical post-amplifier unit via the first optical supervisory device; and the first optical supervisory device multiplexes the information, which needs to be transmitted in the optical supervisory channel, with the master optical channel at the first optical post-amplifier unit through a fixed wavelength and transmits it out via a physical transport link to complete the transmitting processing of the optical supervisory channel; and the second optical supervisory device separates the signals transmitted by the optical supervisory channel from the master optical channel in the physical transport link through the second optical pre-amplifier unit to complete the receiving processing of the optical supervisory channel.

11. The method according to claim 5, wherein the optical supervisory channel comprises:

a first optical post-amplifier unit, a first optical supervisory device, a first optical pre-amplifier unit, a first optical multiplexer and a first optical de-multiplexer being located in the first node, and a second optical pre-amplifier unit, a second optical supervisory device, a second optical post-amplifier unit, a second optical multiplexer and a second optical de-multiplexer being located in the second node, wherein the first optical post-amplifier unit is connected to the second optical pre-amplifier unit via a master optical channel; the second optical pre-amplifier unit is connected to the second optical de-multiplexer; the second optical de-multiplexer is connected to the second optical multiplexer via the second optical supervisory device; and the second optical multiplexer is connected to the second optical post-amplifier unit;

the second optical post-amplifier unit is connected to the first optical pre-amplifier unit via the master optical channel; the first optical pre-amplifier unit is connected to the first optical de-multiplexer; the first optical de-multiplexer is connected to the first optical multiplexer via the first optical supervisory device; and the first optical multiplexer is connected to the second optical post-amplifier unit; and the first optical supervisory device multiplexes the information, which needs to be transmitted in the optical supervisory channel, with the master optical channel at the first optical multiplexer through a fixed wavelength and transmits it out via a physical transport link to complete the transmitting processing of the optical supervisory channel; the second optical supervisory device separates the signals transmitted by the optical supervisory channel from the master optical channel in the physical transport link through the second optical de-multiplexer to complete the receiving processing of the optical supervisory channel.

12. The method according to claim 10, wherein the physical transport link comprises any of the following: an optical transport section, an optical multiplex section, and a TE link.

13. The system according to claim 3, wherein the physical transport link comprises any of the following: an optical transport section, an optical multiplex section, and a TE link.

14. The method according to claim 6, wherein the optical supervisory channel comprises:

a first optical post-amplifier unit, a first optical supervisory device and a first optical pre-amplifier unit being located in the first node, and a second optical pre-amplifier unit, a second optical supervisory device and a second optical post-amplifier unit being located in the second node, wherein the first optical post-amplifier unit is connected to the second optical pre-amplifier unit via a master optical channel; the second optical pre-amplifier unit is connected to the second optical post-amplifier unit via the second optical supervisory device; and the second optical post-amplifier unit is connected to the first optical pre-amplifier unit via the master optical channel; the first optical pre-amplifier unit is connected to the first optical post-amplifier unit via the first optical supervisory device; and the first optical supervisory device multiplexes the information, which needs to be transmitted in the optical supervisory channel, with the master optical channel at the first optical post-amplifier unit through a fixed wavelength and transmits it out via a physical transport link to complete the transmitting processing of the optical supervisory channel; and the second optical supervisory device separates the signals transmitted by the optical supervisory channel from the master optical channel in the physical transport link through the second optical pre-amplifier unit to complete the receiving processing of the optical supervisory channel.

15. The method according to claim 7, wherein the optical supervisory channel comprises:

a first optical post-amplifier unit, a first optical supervisory device and a first optical pre-amplifier unit being located in the first node, and a second optical pre-amplifier unit, a second optical supervisory device and a second optical post-amplifier unit being located in the second node, wherein the first optical post-amplifier unit is connected to the second optical pre-amplifier unit via a master optical channel; the second optical pre-amplifier unit is connected to the second optical post-amplifier unit via the second optical supervisory device; and the second optical post-amplifier unit is connected to the first optical pre-amplifier unit via the master optical channel; the first optical pre-amplifier unit is connected to the first optical post-amplifier unit via the first optical supervisory device; and the first optical supervisory device multiplexes the information, which needs to be transmitted in the optical supervisory channel, with the master optical channel at the first optical post-amplifier unit through a fixed wavelength and transmits it out via a physical transport link to complete the transmitting processing of the optical supervisory channel; and the second optical supervisory device separates the signals transmitted by the optical supervisory channel from the master optical channel in the physical transport link through the second optical pre-amplifier unit to complete the receiving processing of the optical supervisory channel.

16. The method according to claim 8, wherein the optical supervisory channel comprises:

a first optical post-amplifier unit, a first optical supervisory device and a first optical pre-amplifier unit being located in the first node, and a second optical pre-amplifier unit, a second optical supervisory device and a second optical post-amplifier unit being located in the second node, wherein the first optical post-amplifier unit is connected to the second optical pre-amplifier unit via a master optical channel; the second optical pre-amplifier unit is connected to the second optical post-amplifier unit via the second optical supervisory device; and the second optical post-amplifier unit is connected to the first optical pre-amplifier unit via the master optical channel; the first optical pre-amplifier unit is connected to the first optical post-amplifier unit via the first optical supervisory device; and the first optical supervisory device multiplexes the information, which needs to be transmitted in the optical supervisory channel, with the master optical channel at the first optical post-amplifier unit through a fixed wavelength and transmits it out via a physical transport link to complete the transmitting processing of the optical supervisory channel; and the second optical supervisory device separates the signals transmitted by the optical supervisory channel from the master optical channel in the physical transport link through the second optical pre-amplifier unit to complete the receiving processing of the optical supervisory channel.

17. The method according to claim 6, wherein the optical supervisory channel comprises:

a first optical post-amplifier unit, a first optical supervisory device, a first optical pre-amplifier unit, a first optical multiplexer and a first optical de-multiplexer being located in the first node, and a second optical pre-amplifier unit, a second optical supervisory device, a second optical post-amplifier unit, a second optical multiplexer and a second optical de-multiplexer being located in the second node, wherein the first optical post-amplifier unit is connected to the second optical pre-amplifier unit via a master optical channel; the second optical pre-amplifier unit is connected to the second optical de-multiplexer; the second optical de-multiplexer is connected to the second optical multiplexer via the second optical supervisory device; and the second optical multiplexer is connected to the second optical post-amplifier unit;

the second optical post-amplifier unit is connected to the first optical pre-amplifier unit via the master optical channel; the first optical pre-amplifier unit is connected to the first optical de-multiplexer; the first optical de-multiplexer is connected to the first optical multiplexer via the first optical supervisory device; and the first optical multiplexer is connected to the second optical post-amplifier unit; and the first optical supervisory device multiplexes the information, which needs to be transmitted in the optical supervisory channel, with the master optical channel at the first optical multiplexer through a fixed wavelength and transmits it out via a physical transport link to complete the transmitting processing of the optical supervisory channel; the second optical supervisory device separates the signals transmitted by the optical supervisory channel from the master optical channel in the physical transport link through the second optical de-multiplexer to complete the receiving processing of the optical supervisory channel.

18. The method according to claim 7, wherein the optical supervisory channel comprises:

a first optical post-amplifier unit, a first optical supervisory device, a first optical pre-amplifier unit, a first optical multiplexer and a first optical de-multiplexer being located in the first node, and a second optical pre-amplifier unit, a second optical supervisory device, a second optical post-amplifier unit, a second optical multiplexer and a second optical de-multiplexer being located in the second node, wherein the first optical post-amplifier unit is connected to the second optical pre-amplifier unit via a master optical channel; the second optical pre-amplifier unit is connected to the second optical de-multiplexer; the second optical de-multiplexer is connected to the second optical multiplexer via the second optical supervisory device; and the second optical multiplexer is connected to the second optical post-amplifier unit;

the second optical post-amplifier unit is connected to the first optical pre-amplifier unit via the master optical channel; the first optical pre-amplifier unit is connected to the first optical de-multiplexer; the first optical de-multiplexer is connected to the first optical multiplexer via the first optical supervisory device; and the first optical multiplexer is connected to the second optical post-amplifier unit; and the first optical supervisory device multiplexes the information, which needs to be transmitted in the optical supervisory channel, with the master optical channel at the first optical multiplexer through a fixed wavelength and transmits it out via a physical transport link to complete the transmitting processing of the optical supervisory channel; the second optical supervisory device separates the signals transmitted by the optical supervisory channel from the master optical channel in the physical transport link through the second optical de-multiplexer to complete the receiving processing of the optical supervisory channel.

19. The method according to claim 8, wherein the optical supervisory channel comprises:

a first optical post-amplifier unit, a first optical supervisory device, a first optical pre-amplifier unit, a first optical multiplexer and a first optical de-multiplexer being located in the first node, and a second optical pre-amplifier unit, a second optical supervisory device, a second optical post-amplifier unit, a second optical multiplexer and a second optical de-multiplexer being located in the second node, wherein the first optical post-amplifier unit is connected to the second optical pre-amplifier unit via a master optical channel; the second optical pre-amplifier unit is connected to the second optical de-multiplexer; the second optical de-multiplexer is connected to the second optical multiplexer via the second optical supervisory device; and the second optical multiplexer is connected to the second optical post-amplifier unit;

the second optical post-amplifier unit is connected to the first optical pre-amplifier unit via the master optical channel; the first optical pre-amplifier unit is connected to the first optical de-multiplexer; the first optical de-multiplexer is connected to the first optical multiplexer via the first optical supervisory device; and the first optical multiplexer is connected to the second optical post-amplifier unit; and the first optical supervisory device multiplexes the information, which needs to be transmitted in the optical supervisory channel, with the master optical channel at the first optical multiplexer through a fixed wavelength and transmits it out via a physical transport link to complete the transmitting processing of the optical supervisory channel; the second optical supervisory device separates the signals transmitted by the optical supervisory channel from the master optical channel in the physical transport link through the second optical de-multiplexer to complete the receiving processing of the optical supervisory channel.

20. The method according to claim 11, wherein the physical transport link comprises any of the following: an optical transport section, an optical multiplex section, and a TE link.

* * * * *